(12) United States Patent
Yu

(10) Patent No.: US 9,001,997 B2
(45) Date of Patent: Apr. 7, 2015

(54) TELEPHONE WITH HANDSFREE FUNCTION

(71) Applicant: Hon Hai Precision Industry Co., Ltd., New Taipei (TW)

(72) Inventor: Chin-Ming Yu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/954,926

(22) Filed: Jul. 30, 2013

(65) Prior Publication Data

US 2014/0037085 A1 Feb. 6, 2014

(30) Foreign Application Priority Data

Aug. 6, 2012 (TW) .............................. 101215094 U

(51) Int. Cl.
*H04M 1/00* (2006.01)
*H04M 9/00* (2006.01)
*H04M 1/60* (2006.01)

(52) U.S. Cl.
CPC .................................. *H04M 1/6033* (2013.01)

(58) Field of Classification Search
USPC ......................................................... 379/425
See application file for complete search history.

(56) References Cited

U.S. PATENT DOCUMENTS

2008/0150482 A1* 6/2008 Yazdi et al. ................... 320/115

FOREIGN PATENT DOCUMENTS

GB 2276514 A * 9/1994

* cited by examiner

*Primary Examiner* — Alexander Jamal
(74) *Attorney, Agent, or Firm* — Novak Druce Connolly Bove + Quigg LLP

(57) ABSTRACT

An exemplary embodiment of a telephone with handsfree function includes a telephone set and a handset. Two metal pieces are fixed in the handset, and two electromagnetic valves are fixed in the telephone set. A processing circuit in the telephone set powers on the electromagnetic valves when the handsfree function of the telephone is enabled to generate an electromagnetic field. The electromagnetic valves magnetically attract the metal pieces, such that the handset is firmly held on the telephone set.

11 Claims, 4 Drawing Sheets

TELEPHONE WITH HANDSFREE FUNCTION

BACKGROUND

1. Technical Field

The present disclosure generally relates to a telephone, and particularly to a telephone with handsfree function.

2. Description of Related Art

A telephone includes a telephone set and a handset arranged on the telephone set. Nowadays, most telephones provide handsfree function via speakerphones, which allows users to speak to each other without holding the handset. However, when the handsfree function is turned on during a call, a voice of a caller may be too loud, and vibrations caused by the amplitude of the voice may cause the handset to shake slightly on the telephone set and cause noise.

What is needed, therefore, is a means which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Reference will be made to the drawings to describe various embodiments.

Figure 1:
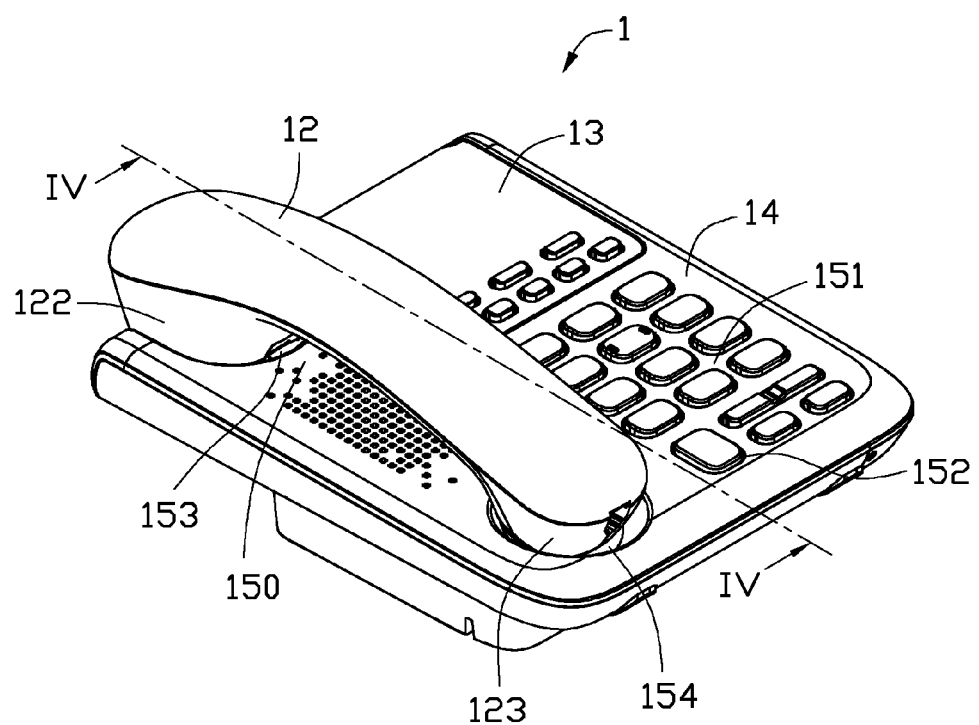
FIG. 1 is an isometric view of a telephone according to a first embodiment of the disclosure. The telephone includes a telephone set and a handset.

Referring to FIG. 1, in one embodiment, a telephone 1 with handsfree function includes a telephone set 13 and a handset 12. The telephone set 13 may be placed on a flat surface, such as a surface of a desk, and the handset 12 is arranged on the telephone set 13. The handset 12 can be picked up from the telephone set 13 and replaced on the telephone set 13.

Figure 2:
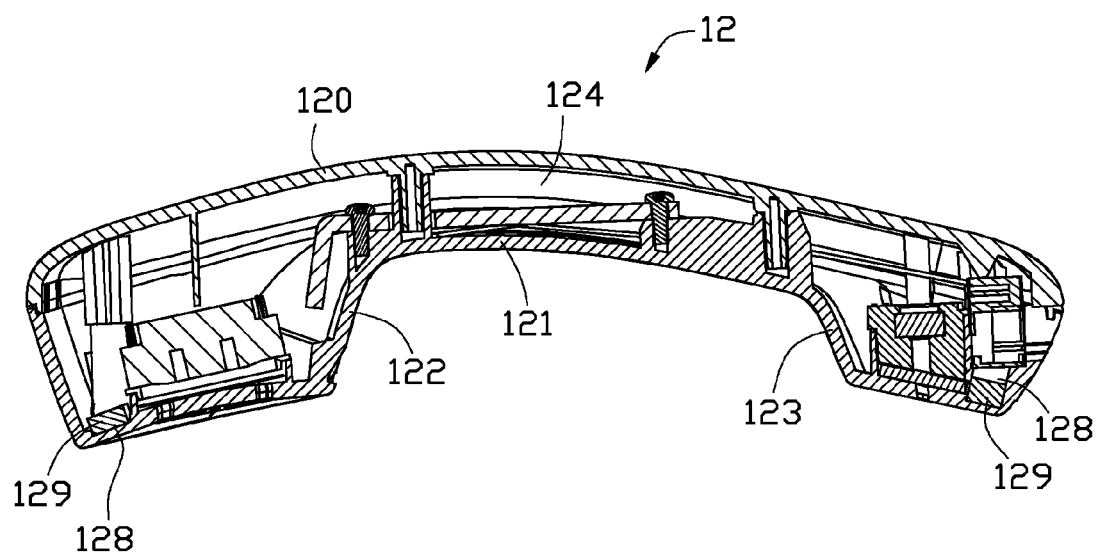
FIG. 2 is a cross-sectional, isometric view of the telephone set of FIG. 1.

Referring also to FIG. 2, the handset 12 includes a first top cover 120 and a first bottom cover 121. The first top cover 120 and the first bottom cover 121 cooperate to define a first receiving space 124. The first bottom cover 121 includes a receiver part 122 and a microphone part 123. Each of the receiver part 122 and the microphone part 123 defines a first fixing groove 128 at an inner surface of the receiver part 122 or the microphone part 123, and the inner surfaces of the receiver part 122 and the microphone part 123 face the first receiving space 124. Two metal pieces 129 are fixed in the two first fixing grooves 128. The metal pieces 129 are ferromagnetic.

Figure 3:
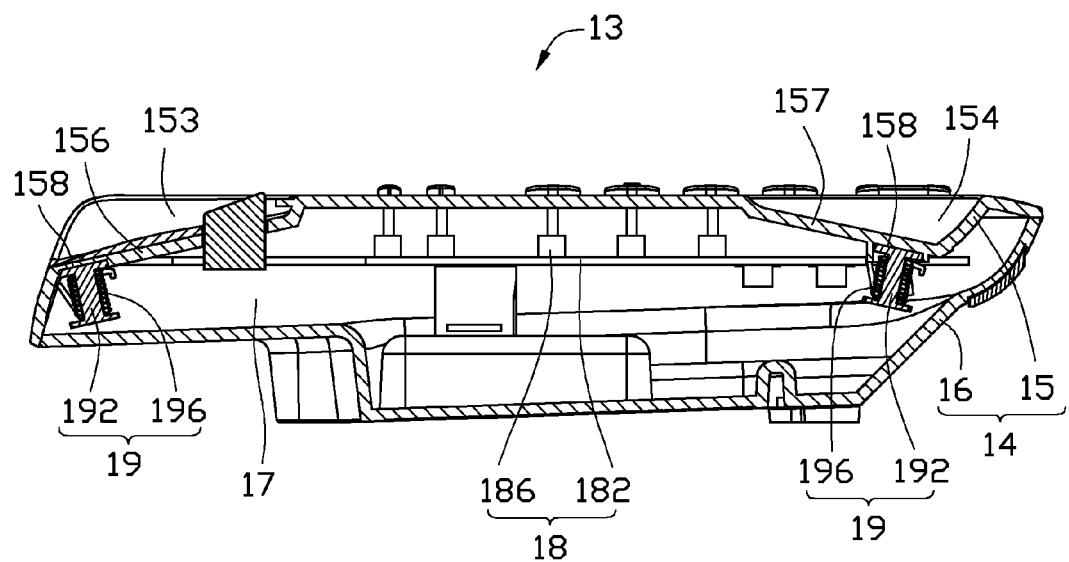
FIG. 3 is an exploded, isometric view of the handset of FIG. 1.

Referring also to FIG. 3, the telephone set 13 includes a housing 14, a circuit board 18 and two electromagnetic valves 19. The circuit board 18 and the electromagnetic valves 19 are fixed in the housing 14. The housing 14 includes a second top cover 15 and a second bottom cover 16. The second top cover 15 and the second bottom cover 16 cooperate to define a second receiving space 17.

The second top cover 15 includes a button module 151 and a holding part 150 for holding the handset 12. The holding part 150 includes a first portion 156 and a second portion 157. The first portion 156 and the second portion 157 are respectively located at opposite ends of the holding part 150. The first portion 156 defines a first recess 153 to receive a portion of the receiver part 122 of the handset 12. The second portion 157 defines a second recess 154 to receive a portion of the microphone part 123 of the handset 12. Each of the first portion 156 and the second portion 158 defines a second fixing groove 158 at an inner surface of the first portion 156 or the second portion 158, and the inner surfaces of the first portion 156 and the second portion 158 face the second receiving space 17. The second fixing grooves 158 correspond to the first fixing grooves 128. One end of each electromagnetic valve 19 is fixed in the second fixing groove 158. Each of the electromagnetic valves 19 includes a base 192 and a coil 196 surrounding the base 192. A top end of the base 192 is installed in the second fixing groove 158. The button moudle 151 defines a plurality of through holes 152.

The circuit board 18 includes a processing circuit 182, which is electrically connected to the coil 196 of each electromagnetic valve 19. A plurality of buttons 186 corresponding to the button module 151 is mounted on the circuit board 18, and the buttons 186 extend out of the housing 14 via the through holes 152. A user inputs an operation signal via the buttons 186, and the processing circuit 182 receives the operation signal and carries out a corresponding function of the telephone 1.

Figure 4:
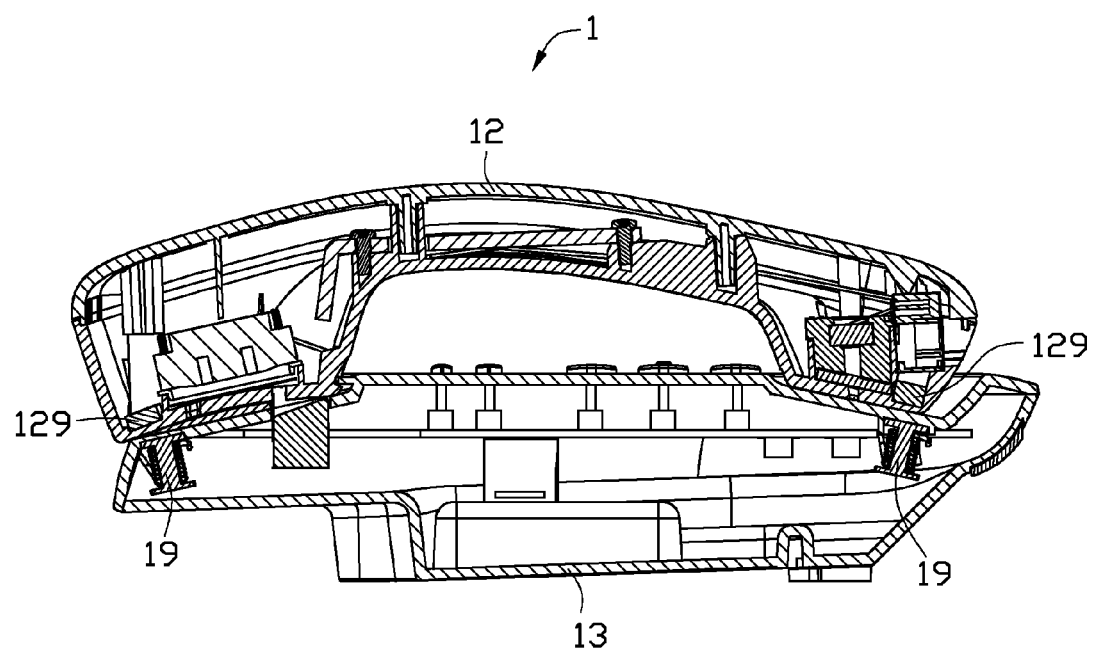
FIG. 4 is a cross-sectional view of the telephone of FIG. 1, taken along line IV-IV.

Referring also to FIG. 4, when the handsfree function of the telephone 1 is enabled during a call by pressing a corresponding button 186, the handset 12 is kept on the telephone set 13. The processing circuit 182 provides an electrical current to the coil 196 when the handsfree function of the telephone 1 is enabled. Thus, an electromagnetic field is generated by the electromagnetic valves 19 to magnetically attract the metal pieces 129. Therefore, the handset 12 is firmly held on the holding part 150 of the telephone set 13. When the call is finished, the handsfree function of the telephone 1 is disabled by pressing the corresponding button 186 again, and the processing circuit 182 deactivates the coil 196. Thus, the electromagnetic field vanishes, and the metal pieces 129 cease being magnetically attracted to the electromagnetic valves 19.

With the above-described configuration, when the handsfree function is enabled, the electromagnetic valves 19 magnetically attract the metal pieces 129. Therefore, the handset 12 is firmly held on the holding part 150 of the telephone set 13, such that the handset 12 will not shake from a loud noise of a caller.

It is believed that the present embodiments and their advantages will be understood from the foregoing description, and it will be apparent that various changes may be made thereto without departing from the spirit and scope of the description or sacrificing all of their material advantages, the examples hereinbefore described merely being exemplary embodiments.

What is claimed is:

1. A telephone having a handsfree function, comprising:
   a handset comprising:
      a receiver part;
      a microphone part;

a metal piece attached to at least one of the receiver part and the microphone part, the metal piece being ferromagnetic;
a first top cover; and
a first bottom cover comprising the receiver part and the microphone part, the first top cover and the first bottom cover cooperatively defining a first receiving space;
a telephone set comprising:
a housing comprising:
a holding part for holding the handset, the handset being detachably engaged with the holding part, the holding part comprising:
a first portion and a second portion, the first portion defining a first recess to receive the receiver part of the handset, and the second portion defining a second recess to receive the microphone part of the handset;
a second top cover; and
a second bottom cover, wherein the second top and bottom covers cooperate to define a second receiving space, the second top cover comprising the holding part;
a circuit board received in the housing, the circuit board comprising a processing circuit; and
at least one electromagnetic valve fixed in the housing and spatially corresponding to the metal piece, the at least one electromagnetic valve electrically connected to the processing circuit of the circuit board,
wherein the processing circuit is configured for providing an electrical current to the electromagnetic valve when the handsfree function is enabled, such that an electromagnetic field is generated by the electromagnetic valves when the electrical current is provided, wherein when the handsfree function is disabled, the processing circuit is configured to deactivate the electromagnetic valve, thus removing the electromagnetic field.

2. The telephone of claim 1, wherein the at least one electromagnetic valve comprises a base and a coil surrounding the base, and the coil is electrically connected to the processing circuit of the circuit board.

3. The telephone of claim 1, wherein each of the receiver part and the microphone part is attached with a metal piece, the at least one electromagnetic valve includes two electromagnetic valves spatially correspond to the respective metal pieces.

4. The telephone of claim 3, wherein each of the receiver part and the microphone part defines a first fixing groove at an inner surface of the receiver part or the microphone part, the inner surface facing the first receiving space, and the two metal pieces are fixed in the first fixing grooves of the receiver part and the microphone part.

5. The telephone of claim 4, wherein each of the first portion and the second portion defines a second fixing groove at an inner surface of the first portion or the second portion, and the inner surfaces of the first and second portions facing the second receiving space, the second fixing grooves correspond to the first fixing grooves, and ends of the two electromagnetic valves are fixed in the second fixing grooves.

6. A telephone having a handsfree function, comprising:
a handset comprising a receiver part and a microphone part, and a metal piece attached on at least one of the receiver part and the microphone part, and the metal piece being ferromagnetic, a first top cover and a first bottom cover, the first bottom cover comprising the receiver part and the microphone part, wherein the first top and bottom covers cooperate to define a first receiving space;
a telephone set comprising a housing and a circuit board received in the housing, the circuit board comprising a processing circuit, the housing comprising a holding part for holding the handset, a second top cover and a second bottom cover, the second top cover comprising the holding part, the holding part comprises a first portion and a second portion, the first portion defines a first recess to receive the receiver part of the handset, and the second portion defines a second recess to receive the microphone part of the handset, wherein the second top and bottom covers cooperate to define a second receiving space;
at least one electromagnetic valve fixed in the housing and spatially corresponding to the metal piece, the at least one electromagnetic valve comprising a base and a coil surrounding the base, the coil electrically connected to the processing circuit of the circuit board;
wherein the processing circuit is configured to provide an electrical current to the coil when the handsfree function is enabled, such that the metal piece is magnetically attracted by the electromagnetic valve; when the handsfree function is disabled, the processing circuit is configured to deactivate the coil, and the magnetic attraction between the electromagnetic valve and the metal piece vanishes.

7. The telephone of claim 6, wherein each of the receiver part and the microphone part is attached with a metal piece, the at least one electromagnetic valve includes two electromagnetic valves spatially correspond to the respective metal pieces.

8. The telephone of claim 7, wherein each of the receiver part and the microphone part defines a first fixing groove at an inner surface of the receiver part or the microphone part, the inner surface facing the first receiving space, and the two metal pieces are fixed in the first fixing grooves of the receiver part and the microphone part.

9. The telephone of claim 8, wherein each of the first portion and the second portion defines a second fixing groove at an inner surface of the first portion or the second portion, and the inner surfaces of the first and second portions facing the second receiving space, the second fixing grooves correspond to the first fixing grooves, and ends of the two electromagnetic valves are fixed in the second fixing grooves.

10. A telephone having a hands free function, comprising:
a handset comprising a receiver part and a microphone part, and a metal piece attached on at least one of the receiver part and the microphone part, the metal piece being ferromagnetic, each of the receiver part and the microphone part defining a first fixing groove at an inner surface of the receiver part or the microphone part, the inner surface facing an inside space of the handset, and the two metal pieces fixed in the first fixing grooves of the receiver part and the microphone part;
a telephone set comprising a housing and a circuit board received in the housing, the circuit board comprising a processing circuit, the housing comprising a first recess for receiving the receiver part and a second recess for receiving the microphone part;
at least one electromagnetic valve fixed in the housing and spatially corresponding to the metal piece, the at least one electromagnetic valve electrically connected to the processing circuit of the circuit board;
wherein the processing circuit is configured for providing an electrical current to the electromagnetic valve when the handsfree function is enabled, such that an electromagnetic field is generated by the electromagnetic valves when the electrical current is provided.

11. The telephone of claim 10, wherein each of the first portion and the second portion defines a second fixing groove at an inner surface of the first portion or the second portion, and the inner surfaces of the first and second portions facing an inner space of the telephone set, the second fixing grooves correspond to the first fixing grooves, and ends of the two electromagnetic valves are fixed in the second fixing grooves.

\* \* \* \* \*